(12) United States Patent
Ishii et al.

(10) Patent No.: US 7,383,104 B2
(45) Date of Patent: Jun. 3, 2008

(54) LOW-NOISE FLIGHT SUPPORT SYSTEM

(75) Inventors: Hirokazu Ishii, Tokyo (JP); Kohei Funabiki, Tokyo (JP); Yoshinori Okuno, Tokyo (JP); Hiromi Gomi, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 169 days.

(21) Appl. No.: 11/196,397

(22) Filed: Aug. 4, 2005

(65) Prior Publication Data

US 2006/0111818 A1 May 25, 2006

(30) Foreign Application Priority Data

Aug. 6, 2004 (JP) ............... 2004-231299

(51) Int. Cl.
G06F 7/00 (2006.01)
G06F 17/00 (2006.01)

(52) U.S. Cl. .......... 701/3; 701/1; 701/3; 701/7; 701/8; 701/9; 701/10; 244/1 N; 244/75; 244/194

(58) Field of Classification Search ........... 701/10, 701/3, 4; 244/1, 194; 340/965, 945; 381/941
See application file for complete search history.

(56) References Cited

U.S. PATENT DOCUMENTS

| | | | | | |
|---|---|---|---|---|---|
| 4,019,702 | A | * | 4/1977 | Annin | 244/182 |
| 4,715,559 | A | * | 12/1987 | Fuller | 244/1 N |
| 6,408,978 | B1 | * | 6/2002 | Premus | 181/120 |
| 6,885,340 | B2 | * | 4/2005 | Smith et al. | 342/465 |
| 6,992,626 | B2 | * | 1/2006 | Smith | 342/454 |
| 7,126,534 | B2 | * | 10/2006 | Smith et al. | 342/456 |
| 7,181,020 | B1 | * | 2/2007 | Riley | 381/56 |
| 2005/0098681 | A1 | * | 5/2005 | Berson et al. | 244/1 N |
| 2006/0146174 | A1 | * | 7/2006 | Hagino | 348/349 |
| 2006/0191326 | A1 | * | 8/2006 | Smith et al. | 73/73 |

FOREIGN PATENT DOCUMENTS

| JP | 6-206594 | 7/1994 |
|---|---|---|
| JP | 2002-31543 | 1/2002 |

OTHER PUBLICATIONS

David A. Conner et al., A Tool for Low Noise Procedures Design and Community Noise Impact Assessment: The Rotorcraft Noise Model (RNM), Presented at Heli Japan 2002, Tochigi, Japan, Nov. 11-13, 2002.
"Prediction Method for Lateral Attenuation of Airplane Noise During Takeoff and Landing", (AIR-1751), Society of Automotive Engineers, Inc., 1981.

* cited by examiner

*Primary Examiner*—Jack W. Keith
*Assistant Examiner*—Jonathan M Dager
(74) *Attorney, Agent, or Firm*—Westerman, Hattori, Daniels & Adrian, LLP.

(57) ABSTRACT

It is an object of the present invention to provide a system that is used to provide support so that a pilot can perform flight operations that reduce noise pollution, by devising this system so that noise conditions on the ground are calculated and displayed on the basis of map information for the flight area in which facilities and the like are described, environmental conditions in the flight area such as the wind direction and wind velocity, or the temperature and density of the atmosphere, and noise generation data for the aircraft itself. The apparatus for supporting low-noise flight according to the present invention comprises means for estimating the noise generated by an aircraft using flight data such as the flight speed, the climb and descent rates, the engine power and the like of the aircraft, means for calculating the level at which the noise generated by the aircraft is propagated in the respective regions on the ground, and means for displaying the calculation results on a map in quantitative terms.

20 Claims, 8 Drawing Sheets

Fig. 3 FLOW CHART OF PROGRAM OF EMBODIMENT

Fig. 4
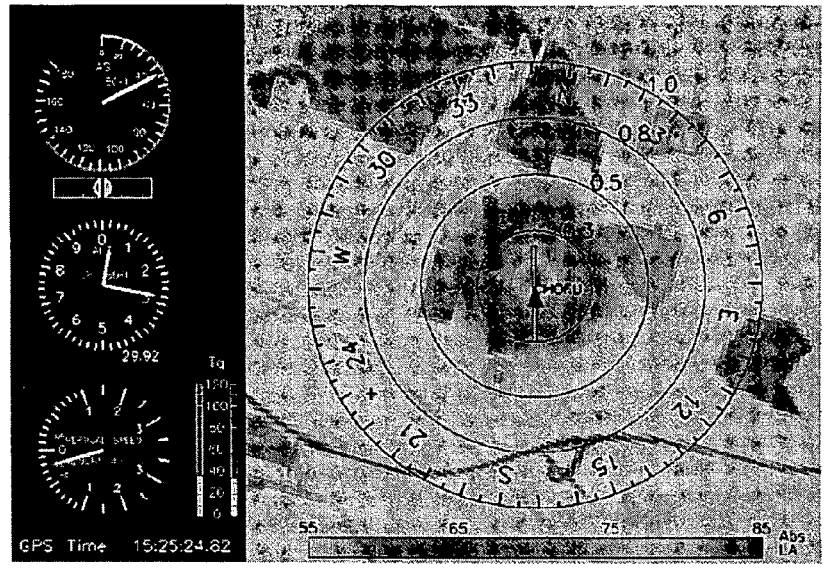
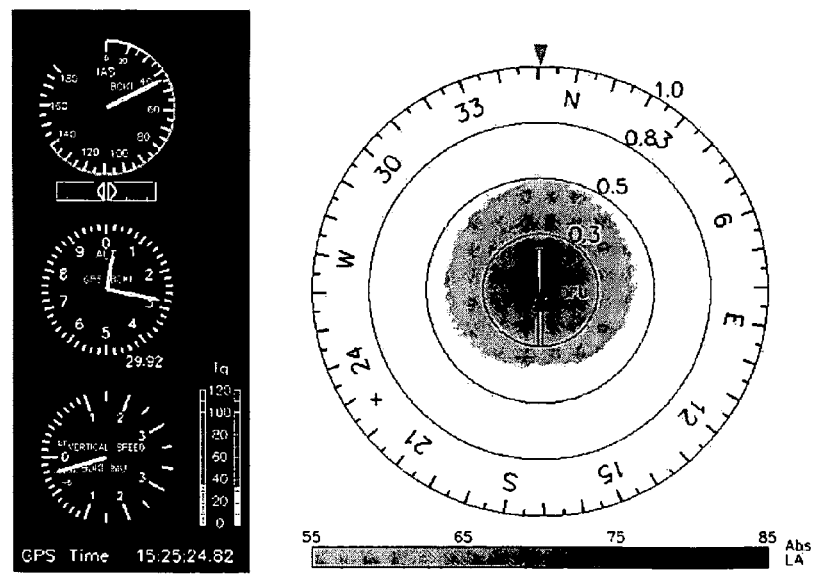

Fig. 5
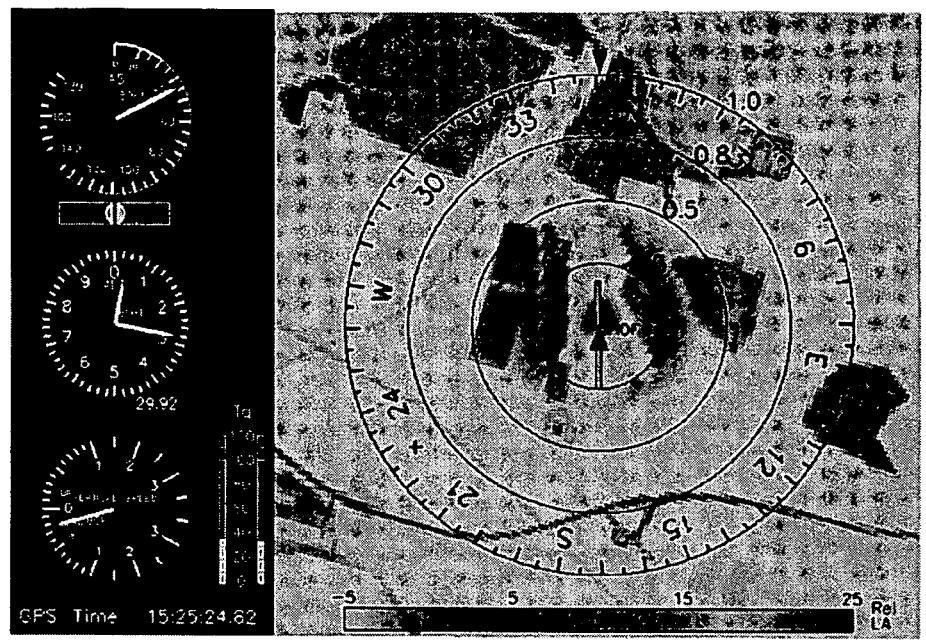
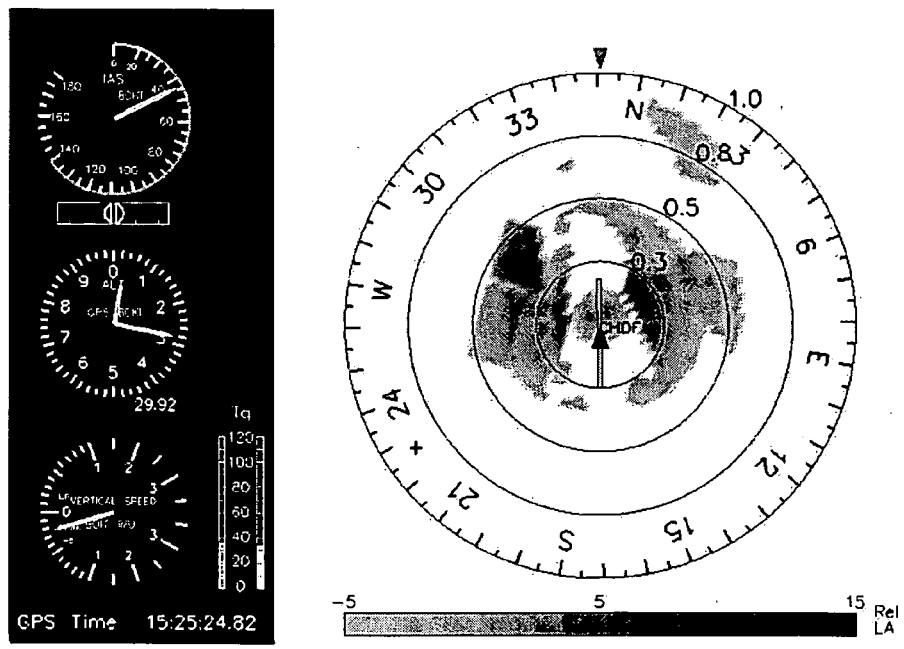

Fig. 6
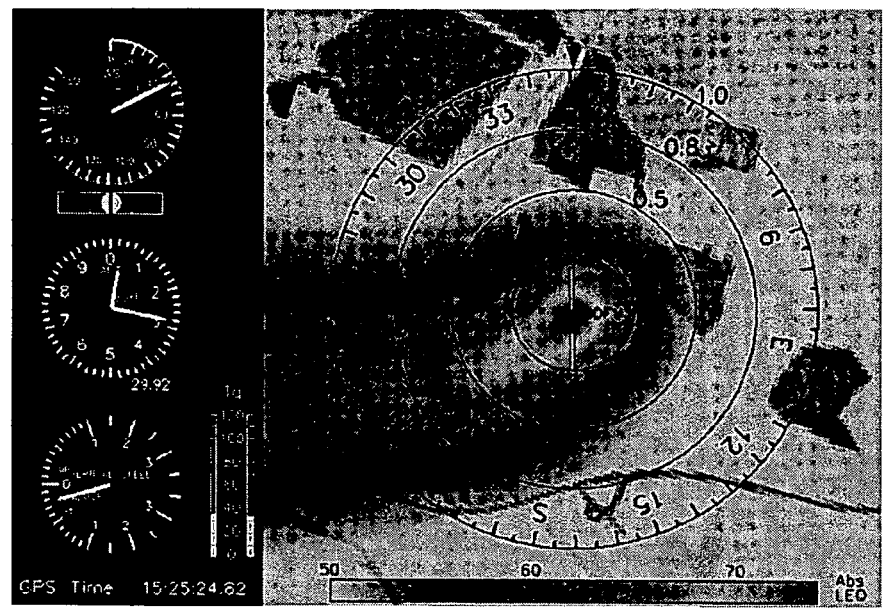
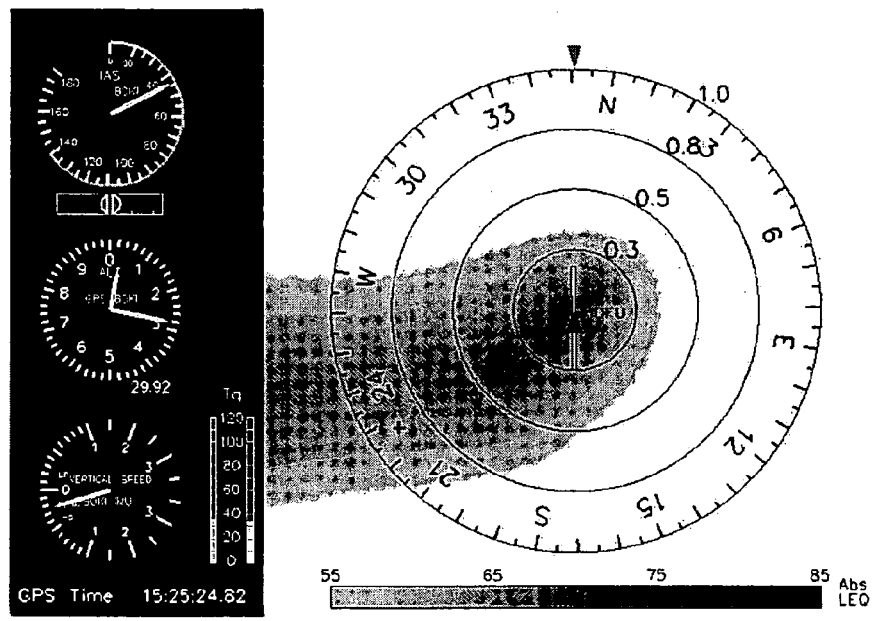

Fig. 7
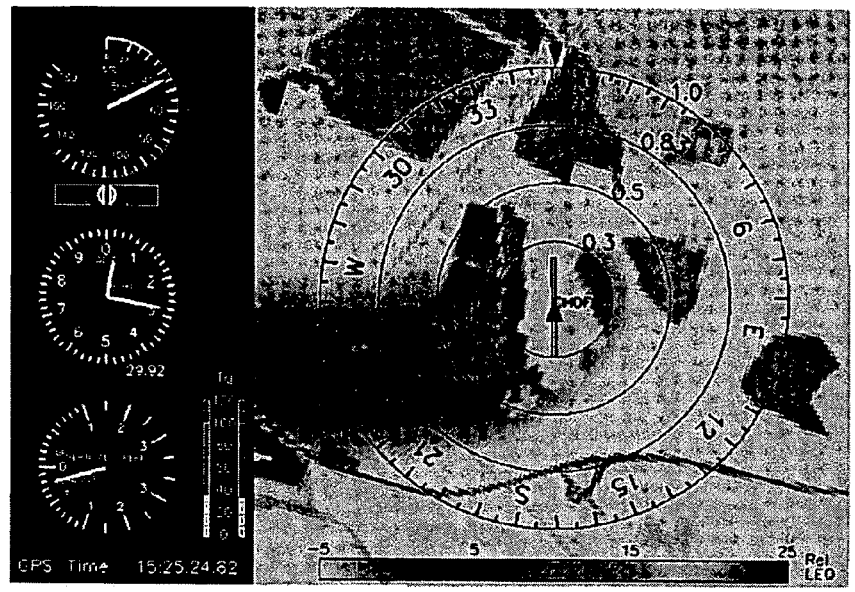
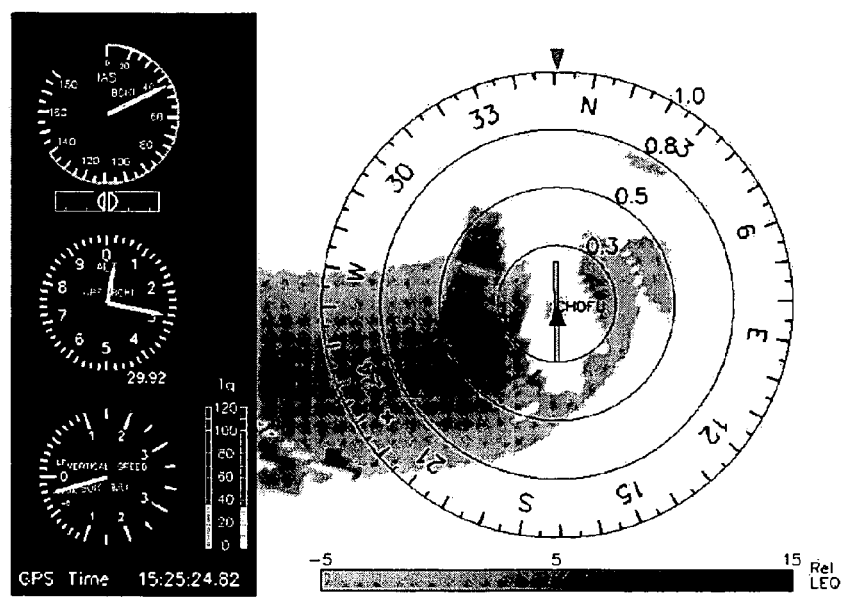

LOW-NOISE FLIGHT SUPPORT SYSTEM

BACKGROUND OF THE INVENTION

1. Field of the Invention

The present invention relates to a system for providing support so that a pilot operating an aircraft can perform a flight that reduces noise pollution in areas where noise is especially likely to be a problem, such as hospitals, schools, residential areas, this support being provided by displaying the noise conditions on the ground to this pilot.

2. Description of the Related Art

Aircraft perform flight operations while generating noise. This noise is generated from various types of sound sources such as the engine, propellers (rotors in the case of helicopters), landing gear and the like. Furthermore, while noise generated by aircraft is being propagated through the atmosphere so that this noise reaches the ground, the noise is affected by environmental conditions at the location in question such as the wind direction, wind velocity, humidity and density of the atmosphere and the like since phenomena such as attenuation, diffraction and the like occur as a result of such atmospheric conditions. For such reasons, the noise heard by the pilot inside the aircraft does not always coincide with the actual noise conditions on the ground.

Furthermore, countermeasures against noise on the ground must be performed not only in accordance with the absolute magnitude of the noise, but also in accordance with the conditions of utilization of the region in question. For example, even noise levels that are not a problem in the case of rivers, lakes and marshes, forest areas, industrial areas and the like are currently recognized as severe noise pollution in the case of hospitals, schools, densely populated areas an the like. In cases where the pilot is flying over familiar territory, the pilot can avoid places where noise pollution is a problem; however, in the case of areas that are being overflown for the first time, it is difficult for the pilot to obtain a sufficient grasp of the conditions in these areas.

Generally, a method is used in which the noise that is generated by noise generating sources is determined either experimentally or theoretically, and the conditions of this noise are evaluated by drawing contours so that these contours are superimposed on a map of the surrounding area. However, conventional techniques are intended for use in a desktop investigation that is performed offline; it is not an object of such techniques to perform a display in real time, and to reflect the results of this display in the operation and control of noise generating sources. In particular, a device which is mounted in aircraft, and which supports the reduction of noise pollution by displaying such information to the pilot has not yet been realized.

A "low-noise flight support device for helicopters" is disclosed in Japanese Unexamined Patent Application No. 6-206594 (title of the invention: "LOW-NOISE FLIGHT SUPPORT DEVICE FOR HELICOPTERS", disclosed on Jul. 26, 1994) as a technique for reducing the noise generated by helicopters. This invention aims at providing a flight support device which realizes a rate of descent that minimizes the blade slapping sound that is generated by the flight of the helicopter. In concrete terms, this system comprises means for detecting the air speed of the helicopter, means for detecting the rate of descent, a low-noise advance path computer and a display device; in this system, the above-mentioned low-noise advance path computer inputs the output from the air speed detection means and the output from the descent rate detection means, outputs a signal indicating the noise level on the ground caused by the helicopter to the display device on the basis of correlation data with an internally stored noise level, and also outputs (to the display device) a signal indicating designated correction values for the rate of descent and air speed that are to be adopted in order to reduce noise to the display device. This is a device which supports the performance of a flight by the pilot so that the blade slapping noise generated by the helicopter is reduced, and is not a device that considers noise conditions on the ground.

Furthermore, a "flight map display device" whose object is to realize a flight map display device that can increase the display speed by drawing a compass rose so that the top of the display screen coincides with a reference bearing, and then rotating and displaying this compass rose in accordance with information relating to the aircraft, has been proposed in Japanese Unexamined Patent Application No. 2002-31543 (title of the invention: "FLIGHT MAP DISPLAY DEVICE", disclosed on Jan. 31, 2002). This flight map display device is a flight map display device which is mounted in an aircraft, and which displays a map of the flight area and a compass rose that indicates a reference bearing on a display screen, wherein this device comprises a graphic drawing part which draws the compass rose described above so that the top of the display screen coincides with the reference direction described above, and a rotating part which rotates the compass rose drawn by the graphics drawing part so that the bearing of the aircraft detected on the outside coincides with the top of the display screen, and this device is devised so that the output of a rotation calculating part is displayed on the screen. Although this invention displays a map of the flight area, this is not a device that supports the pilot in performing a flight that takes conditions of the noise on the ground into account and reduces noise.

In addition, a research paper relating to a method for estimating the noise of a helicopter on the ground on the basis of measured data is introduced in "A New Technique for Estimating Ground Footprint Acoustics for Rotorcraft Using Measured Sound Fields" (Mark R. Wilson, Arnold W. Mueller, and Charles K. Rutledge, presented at the American Helicopter Society Vertical Lift Conference, San Francisco, Calif., 1995), a research paper relating to a method for setting a low-noise flight system and evaluating noise in the surrounding area is introduced in "A Tool for Low Noise Procedures Design and Community Noise Impact Assessment: The Rotorcraft Noise Mode (RNM)", David A. Conner and Juliet A. Page, presented at HeliJapan 2002, Tochigi, Japan, 2002), and a research paper relating to the ground surface attenuation of aircraft noise is introduced in "Prediction Method of Lateral Attenuation of Airplane Noise During Takeoff and Landing", (AIR-1751), Society of Automotive Engineers, 1981). Likewise, however, these devices are not devices for supporting the pilot in performing a flight that takes noise conditions on the ground into account and reduces noise.

SUMMARY OF THE INVENTION

It is an object of the present invention to provide a system that provides support so that a pilot can perform a flight that reduces noise pollution, by calculating and displaying noise conditions on the ground on the basis of map information for the flight area in which facilities and the like are described, the wind direction and wind velocity in the flight area, environmental conditions such as the temperature and density of the atmosphere and the like, and noise generation data for the aircraft itself.

The low-noise flight support system of the present invention comprises means for estimating the noise generated by an aircraft using flight data for the aircraft, means for calculating the level at which the noise generated by the aircraft is propagated in various regions on the ground, and means for displaying the results of these calculations on a map, and further comprises means for quantitatively displaying the level of the noise generated by the aircraft in the respective regions on the ground to the pilot operating the aircraft.

Furthermore, the low-noise flight support system of the present invention comprises means for obtaining meteorological information such as the wind direction and wind velocity in the flight area, the temperature and humidity of the atmosphere and the air pressure, and the level at which the noise generated by the aircraft is propagated in various regions on the ground is calculated with the environmental conditions being take into account.

Furthermore, the low-noise flight support system of the present invention is a system in which the means for displaying the noise level on the ground on a map is means in which a display is installed in the instrument panel of the aircraft, and in which the noise level on the ground is displayed in real time in a contour configuration with this noise level superimposed on a map.

Furthermore, the low-noise flight support system of the present invention is a system in which means for cumulatively calculating noise data on the ground is provided, and a function is provided to display the noise level with cumulative noise data for noise in addition to instantaneous values of noise.

Furthermore, the low-noise flight support system of the present invention is a system in which means for receiving cumulative noise data on the ground for other aircraft is provided, and a function is provided to select either the cumulative values of noise over time generated by the aircraft or values obtained by adding together the cumulative values for the other aircraft on that day, as the cumulative noise data on the ground.

Furthermore, the low-noise flight support system of the present invention is a system in which means for setting noise reference values that are applied according to the land utilization configuration on the ground and means for calculating the difference between the absolute values of noise and these reference values are provided, and a function is provided to select the display configuration of the noise level from among the display of the absolute values of noise and display of the abovementioned difference.

Furthermore, the low-noise flight support system of the present invention comprises a function to perform a numerical display on a map for specified points where it is desired to ascertain the noise conditions in quantitative terms.

Furthermore, the low-noise flight support system of the present invention performs the numerical display in cases exceeding a threshold value by means of an alarm display in order to evoke caution.

Furthermore, the low-noise flight support system of the present invention comprises a function to superimpose the numerical display on a contour display.

Furthermore, the low-noise flight support system of the present invention comprises noise regulation value data established for specified facility areas, wherein the means for calculating the level at which the noise generated by the aircraft is propagated in the respective regions on the ground is means which calculates the noise that is permitted for the aircraft, and outputs a display of this noise.

The low-noise flight support system of the present invention comprises means for estimating the noise generated by an aircraft using flight data for the aircraft, means for calculating the level at which the noise generated by the aircraft is propagated in various regions on the ground, and means for displaying the results of these calculations on a map, wherein information indicating what degree of noise pollution is caused by the noise generated by the aircraft in which region on the ground is quantitatively displayed to the pilot operating the aircraft. Accordingly, this is effective support means which makes it possible for the pilot to perform a flight operation so that noise pollution is reduced by viewing the state of this display.

Furthermore, the low-noise flight support system of the present invention comprises means for obtaining meteorological information for the flight area is provided, and the means for calculating the level at which the noise generated by the aircraft is propagated in various regions on the ground performs calculations with the environmental conditions being taken into account. Accordingly, calculations corresponding to real environmental conditions are performed instead of calculations corresponding to simple distances and shape, so that data that is closer to actual conditions can be obtained.

Furthermore, the means for displaying the noise levels on the ground has a display device mounted on the instrument panel of the aircraft, and displays the noise levels on the ground in real time by means of a contour configuration superimposed on a map; accordingly, conditions can be obtained in an easy-to-understand relationship with the flight area, so that the pilot can easily perform a flight operation that reduces noise pollution.

Furthermore, the low-noise flight support system of the present invention comprises means for calculating cumulative noise data on the ground, and has a function to display the noise levels with cumulative noise data for noise in addition to the instantaneous values of noise. Accordingly, the pilot can quantitatively ascertain not only noise levels at the current point in time, but also effects caused by accumulation over time. Consequently, the pilot can perform a flight which gives consideration to these noise levels so that there is no concentration of noise in specified regions, especially hospitals, schools, densely population regions and the like, within a specified time.

Furthermore, the low-noise flight support system of the present invention comprises means for receiving cumulative noise data on the ground for other aircraft, and has a function to select either values obtained by adding together the cumulative values for other aircraft on that day, or the cumulative values of noise over time generated by the aircraft, as the cumulative noise data on the ground. Accordingly, a flight can be performed in which consideration is given so that there is no concentration of noise within a specified time period by other persons on the ground (including noise generated by other aircraft in addition to noise generated by the aircraft in question).

Furthermore, in the low-noise flight support system of the present invention, the noise level display system comprises a function that can select a configuration that displays the absolute values of noise, and a configuration that sets an applicable noise reference value in accordance with the types of various facilities on the ground, and displays the difference from this reference value. Accordingly, not only simple countermeasures against absolute levels of noise, but also support that gives extremely fine consideration to the noise levels in accordance with the types of respective facilities on the ground, can be performed.

Furthermore, the low-noise flight support system of the present invention comprises a function to perform a numerical display on a map for specified points where it is desired to ascertain the noise conditions in a quantitative manner; accordingly, an easy-to-understand display can be performed in the form of numerical values for specified points requiring special caution in regard to noise.

Furthermore, in the low-noise flight support system of the present invention, the numerical display in cases where the threshold value is exceeded is devised so that an alarm display such as a display in red character, a flashing display or the like is performed; accordingly, the effect in evoking caution in the pilot is especially high.

Furthermore, since the low-noise flight support system of the present invention comprises a function in which the numerical display is superimposed on the contour display, the pilot can thoroughly comprehend the overall conditions and the conditions at specified points.

Furthermore, since the low-noise flight support system of the present invention comprises noise regulation data that is established for specified facility areas, the permissible noise of the aircraft can be calculated and displayed as numerical values by the means that calculate what levels of noise generated by the aircraft are propagated through which regions on the ground. Accordingly, a judgment as to the distance that can be employed to regulated regions can easily be made on the basis of the displayed numerical values, so that the pilot can very easily perform flight operations that reduce noise pollution.

BRIEF DESCRIPTION OF THE DRAWINGS

FIG. 4 is a diagram showing an example of the absolute display of instantaneous noise levels obtained using the system of the present embodiment;

FIG. 5 is a diagram showing an example of the differential display of instantaneous noise levels obtained using the system of the present embodiment;

FIG. 6 is a diagram showing an example of the absolute display of cumulative noise levels obtained using the system of the present embodiment;

FIG. 7 is a diagram showing an example of the differential display of cumulative noise levels obtained using the system of the present embodiment;

DESCRIPTION OF THE PREFERRED EMBODIMENTS

The present invention started with an object of providing support information required in order to prompt an understanding of conditions by the pilot, with the aim of preventing (in advance) an effect of noise generated in the flight of the aircraft on the flight area, especially the occurrence of noise problems in urban areas. The magnitude of the effect of noise is not merely a problem of the absolute levels of noise; this effect varies according to the conditions on the side receiving this effect as well. For example, even if persons working in factories (which are themselves operating in a noisy environment) are not affected, persons who are living in a quiet lifestyle in hospitals or rest homes may be painfully affected by such noise. Furthermore, not only the instantaneous noise levels, but also the amount of noise exposure over time, has a major effect on the psychological burden of noise. For example, repeated takeoff and landing noise places a great psychological burden on people living in the vicinity of the airport, and the noise of aircraft in a holding pattern places a great psychological burden on people living nearby. Based on these problems, the present invention gives consideration for the first time to the provision of information to the pilot (by means of an easily understandable display) indicating the effects of noise on the flight area, and to the provision of information regarding such effects in various forms rather than merely indicating the effects of noise in terms of instantaneous absolute levels.

Figure 1:
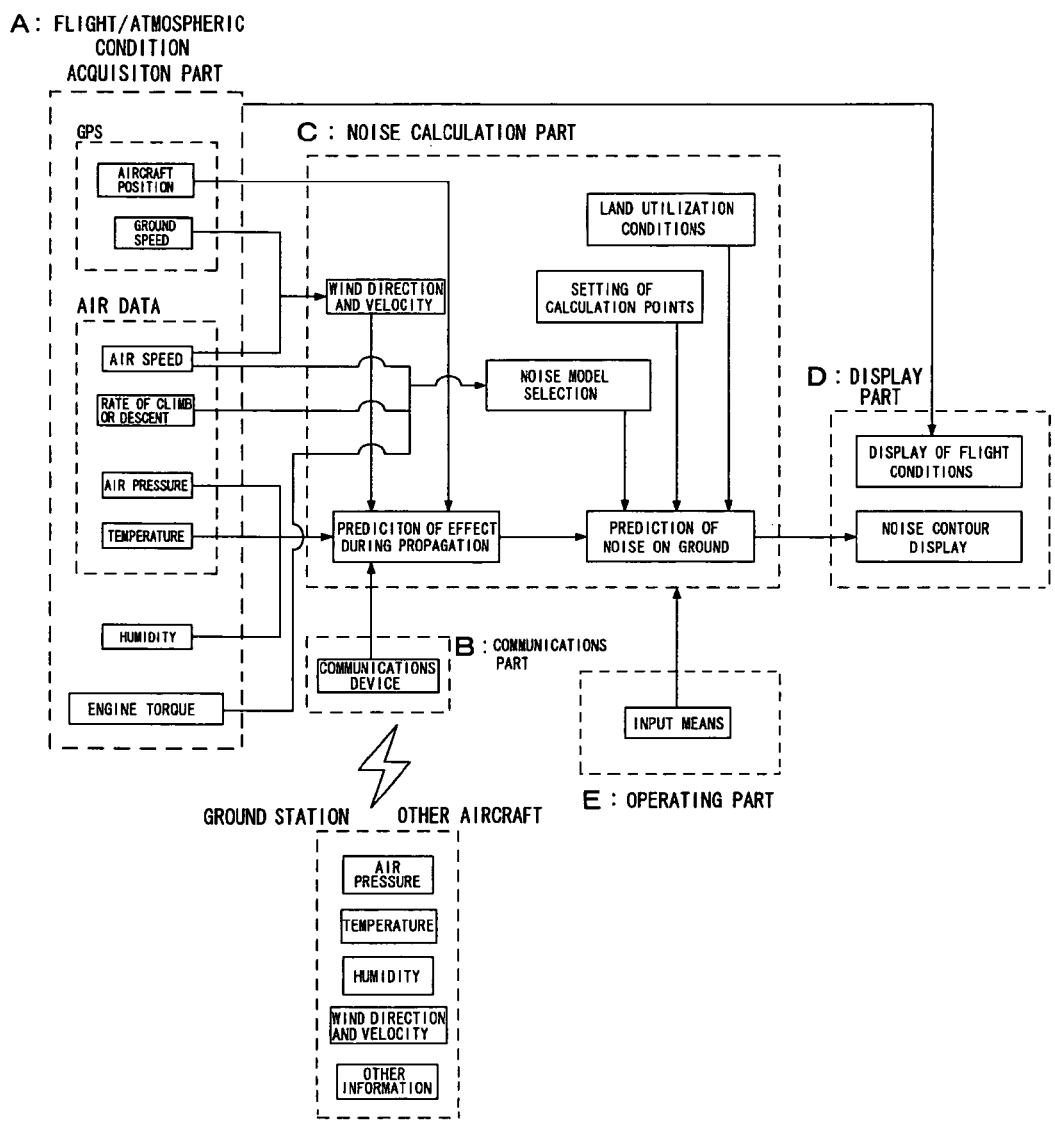
FIG. 1 is a schematic diagram of the basic construction of the aircraft noise condition display system of the present invention.
Figure 2:
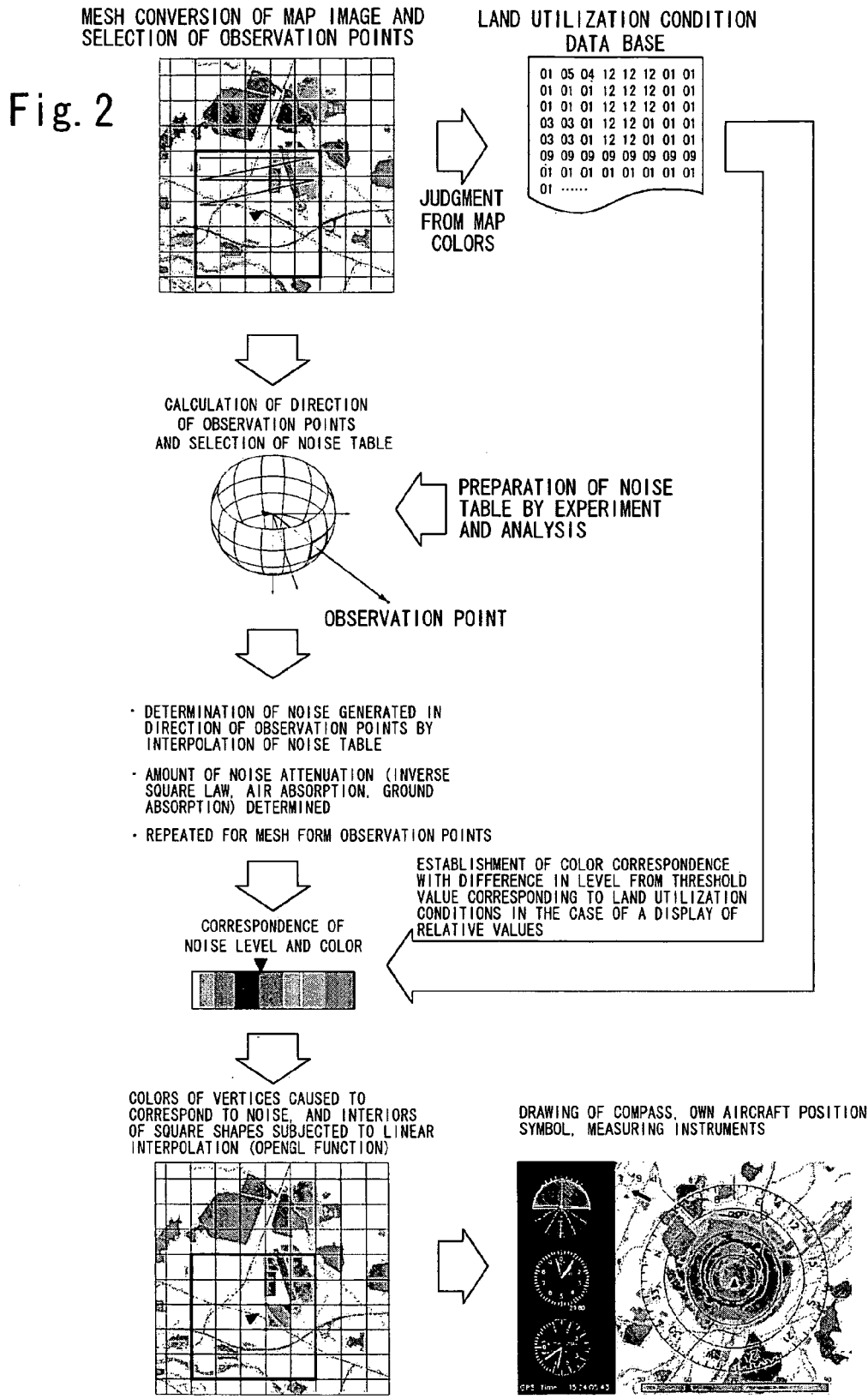
FIG. 2 is a schematic diagram of the operation of the aircraft noise condition display system of the present invention.

The apparatus of the present invention is constructed from a flight/atmospheric condition acquisition part, a communications part, a noise calculation part, a display part and an operating part. An example of the construction of the apparatus is shown in FIG. 1. Furthermore, an outline of the overall flow of the processing is shown in FIG. 2. Details of the respective parts will be described below.

First, in regard to the flight/atmospheric condition acquisition part A, this part acquires data relating to flight conditions such as the air speed of the aircraft, rate of climb or descent, position (latitude and longitude, altitude), ground speed, attitude angle and the like from various sensors mounted on the aircraft (pitot tube, gyro, GPS and the like), as well as data relating to meteorological conditions such as the air temperature, air pressure, wind direction and wind velocity (and the humidity if possible) at the position of the aircraft. Such data (except for the humidity) can be acquired from sensors that are mounted on general aircraft. Not all of these data are essential for the realization of the present invention; however, if all of these data can be utilized, the precision of the noise display is improved.

Next, in regard to the communications part B, this part acquires data relating to meteorological conditions on the ground (air temperature, air pressure, wind direction and velocity, humidity and the like) and noise conditions of other aircraft by communicating with ground facilities (control tower and the like). Not all of these data are essential for the realization of the present invention; however, calculations that are close to actual noise propagation can be performed by utilizing these data; in this case, a noise display that takes into account the effects on people on the ground is possible, and the precision of the display of noise conditions is improved.

Noise calculation part C: the flow of processing of the noise calculation part is as follows.

1. Initialization and Initial Settings

1) Setting of sound source model: a table of the direction of propagation of noise generated by the aircraft (bearing, angle of employment) and noise levels at standard distances is set in accordance with the air speed and path angle.

2) The origin of the fixed ground coordinates (NED: right-handed orthogonal coordinate system with north, east, down as front) is set.

3) A map image is read in.

4) The noise calculation points are set. For example, a range of 18 km is divided into a mesh of 50 m intervals in the north-south and east-west directions, with this mesh centered on the origin of the fixed ground coordinates (see map in FIG. 2).

5) The land utilization conditions are read in. In the case of the land utilization conditions, for example, the east-west direction and north-south direction are divided into a mesh form so that square shapes 50 m on a side are formed, and an index number indicating the classification of the land utilization conditions within each mesh is assigned (see land utilization condition data base in FIG. 2). Here, for example the classification of the land utilization conditions uses the categories of standard, rivers, lakes or marshes, parks, airports, schools, facilities, large buildings, recreational areas (amusement parks, horse racing tracks and the like), high-speed roadways, railroad tracks, and stations.

6) A standard noise value is set for each category of land utilization conditions. Here, for example, these standard values are set as follows: standard 60 dB, rivers, lakes or marshes 80 dB, parks 65 dB, airports 80 dB, schools 50 dB, facilities 55 dB, large buildings 65 dB, recreational areas 70 dB, high-speed roadways 80 dB, railroad tracks 80 dB, stations 80 dB.

7) The coordinates of points where it is desired to display the noise level as a numerical value, and the standard noise values for these points, are set.

8) The lower limit values and upper limit values of the contour display colors (described later) are respectively set for the difference values from the instantaneous noise values.

9) The range for noise prediction is set in terms of distance from the position of the aircraft in the north-south and east-west directions (e.g. ±3500 m), and the observation points are set as 141×141=19,881 points.

2. Calculations (Repeated)

Repeated calculations are performed with the data acquired from the flight/meteorological condition acquisition part and communications part being successively updated. Latitude and longitude data for the position of the aircraft in question is converted into the fixed ground coordinate system (NED), and the corrected air speed, equivalent air speed, true air speed and the like are determined from the indicated air speed data.

In regard to noise calculations:

1) First, the path angle is calculated from the air speed and rate of climb and descent data.

2) Next, on the basis of the air speed and descent angle data, the sound source model is selected and interpolated, and the directionality of the sound source is determined.

3) The numbers of the ground surface mesh included the projected shadow of the aircraft in question on the ground surface are determined.

4) Noise is predicted for the calculation points (19,881 points) that are included in the preset range from the aircraft position and the predetermined noise calculation point range.

5) The relative positions of the respective noise calculation points as seen from the aircraft are converted into bearings, employment angles and distances expressed in the fixed aircraft coordinates by means of an Euler conversion based on the attitude angle of the aircraft.

6) The noise radiated in the directions of the respective calculation points is determined by interpolation of the sound source model on the basis of the bearings and employment angles of the directions of the respective calculation points as seen from the aircraft.

7) The amount of noise attenuation based on the inverse square law is calculated in accordance with the distances between the aircraft and the respective calculation points.

8) The amount of noise attenuation based on air absorption is determined from the meteorological conditions and the distances between the aircraft and the respective calculation points.

9) The amount of attenuation based on ground absorption is determined on the basis of the angle of elevation and distance at which the aircraft is viewed from the observation point.

10) The amount of attenuation based on the inverse square law, air absorption and ground absorption is determined from the generated sound source, and the instantaneous noise levels at the respective calculation points are determined. In order to obtain the cumulative values over time, the current instantaneous noise levels are added to the cumulative values determined up to this point fro the respective calculation points.

11) The noise conditions displayed in accordance with the input from the operating part are selected from a set comprising the instantaneous noise levels, the differences of the instantaneous noise levels from the standard noise value, the cumulative noise levels over time, and the differences of the cumulative noise levels over time from the standard noise value.

Display part D: In the display configuration of the present invention, a noise level display is superimposed on a map of the flight area. The display is disposed on the instrument panel inside the cockpit, and map of the flight area is displayed in this display, so that this map is provided to the pilot. In this map, it is desirable that it be possible to discriminate between industrial areas and residential areas, and that it be possible to read the types of facilities that are located in this area. The map image is rotated so that the bearing of the nose of the aircraft is at the top of the screen, and this image is moved in parallel movement so that the position of the aircraft is in the center of the screen.

A contour configuration, i.e., a system in which lines indicating equal levels are read in and superimposed on the map, is provided as the noise level display system. As was described above, mesh-form noise calculation points are set on the map. Four adjacent points in the east-west and north-south directions are successively selected, and square shapes whose vertices are the noise calculation points are treated as single measurement unit regions. Contour display colors are caused to correspond from the noise levels at the noise calculation points. To indicate a concrete example:

1. In cases where the noise level is equal to or less than the lower limit of the display→transparent; i.e., 100% of the map image is displayed.

2. In cases where the noise level is between the lower limit and ¼ of the display range→blue.

The transparency A is caused to correspond to the line shape so that the value is 0 at the lower limit, and is a nominal value (0.8: i.e., 80% contour display color and 20% map image) at ¼.

3. When the noise level is between ¼ and ⅔ of the display range→a correspondence to the line shape is set so that the color is blue to green. (Transparency A=0 to 0.8)

4. When the noise level is between ⅔ and ¾ of the display range→a correspondence to the line shape is set so that the color is green to yellow. (Transparency A=0 to 0.8)

5. When the noise level is between ¾ and the upper limit of the display range→a correspondence to the line shape is set so that the color is yellow to red. (Transparency A=0 to 0.8)

6. When the noise level is equal to or greater than the upper limit of the display→red (Transparency A=0 to 0.8)

The square shapes determined by these vertices are colored so that these shapes have a gradation in the colors determined by the linear interpolation in two dimensions of the display colors based on the data for the respective vertices, and a contour map is displayed using the regular mesh data.

Furthermore, a noise numerical display is provided as a different display system. In this display, a configuration is used in which the noise levels are set beforehand for points that display numerical values, and the noise levels that are obtained are displayed as numerical values on the map. For example, a list is displayed for the respective points, with the color of the characters displaying the numerical values set as black in cases where the values are less than a predetermined threshold value, and this color set as red in cases where the values are greater than this threshold value. Furthermore, the system may also be devised so that numerical values are displayed on the map if the noise levels are equal to or greater than the standard value, and in this case, the display may be superimposed on the previous contour display. Furthermore, instead of using red characters, this warning display may be caused to correspond to an appropriate alarm display such as a flashing display.

In addition, the following instruments and the like are displayed in order to provide information that supports the flight. This information is the same as that displayed on the instruments of all aircraft, and is not essential to the device of the present invention; however, this information is displayed in order to reduce movement of the line of sight of the pilot, and thus reduce the work load.

1) A symbol indicating one's own aircraft, concentric circles indicating bearings (compass) and distances, and a symbol used to facilitate reading of the aircraft nose position, are displayed.

2) A speed indicator, side slip indicator, altimeter, climb and descent indicator and torque indicator are displayed on the left side of the display screen.

3) In regard to the altimeter, the stipulated value of the barometric altitude is altered in accordance with an operation by the pilot, and this is reflected in the indicated value of the barometric altitude.

Operating part E: The following alterations of the display contents can be made regarding noise levels by operations performed by the pilot. Operating instructions from this operating part E are sent to the noise calculation part C, and selection of the type of predictive calculation of noise on the ground, as well as switching of the magnification of the display map and the like, are performed.

First, in regard to noise types that are displayed, switching of the following can be performed by the operating part.

1) Instantaneous values of noise levels

2) Cumulative values of noise levels over time

3) Cumulative values of noise levels over time adding cumulative values over time for other aircraft Furthermore, in regard to the contents of noise levels, the following can be switched by the operating part.

a) Absolute values of noise b) Differences from set standard noise values taking land utilization techniques into account at respective points on the ground Combinations of these (1, 2, 3)×(a, b) can be selected as display configurations.

Furthermore, adjustments such as enlargement and reduction of the range in which the map, noise contours and the like are displayed on the display can also be made.

EXAMPLE 1

Figure 3:
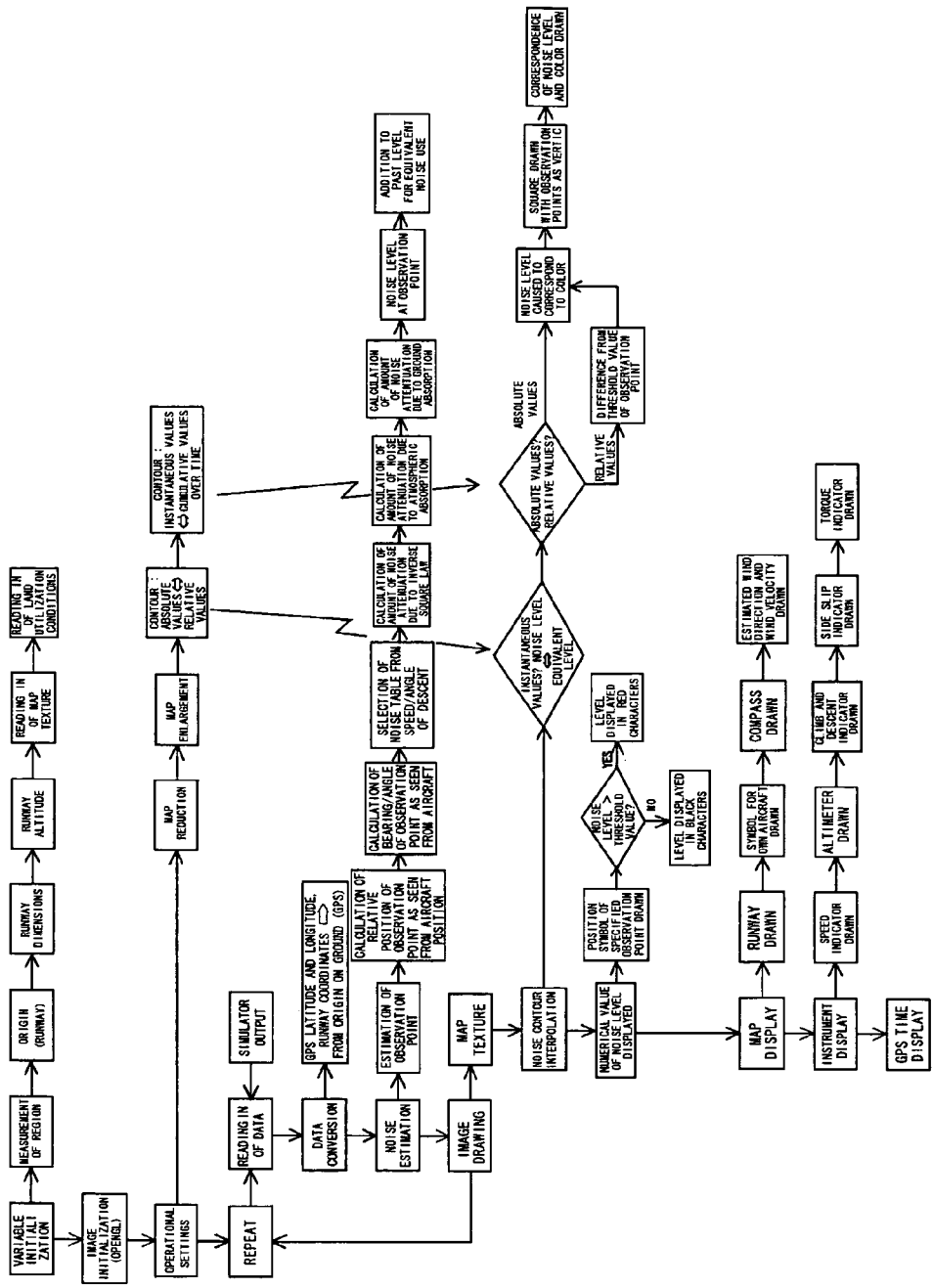
FIG. 3 is a flow chart illustrating the program content and operating flow in one embodiment of the present invention.

FIG. 3 shows a flow chart of a prototype program. The operations of this program will be described in order.

1. First, variable initialization is performed. Here, the setting of the flight area is performed. Next, the origin in the fixed ground coordinate system (NED), e.g., a specified point on the runway or the like, is determined. The runway dimensions are then input. Next, altitude information relating to the runway ground point used as the origin is input. Next, map information for the corresponding region is read out into a work area from the map information stored in the memory region, and the observation point mesh is set. Furthermore, land utilization conditions corresponding to this region are read in from the memory region, and are written into the work area.

2. When this is completed, the display screen is initialized.

3. Next, various selections are performed by operating the operating part. The reduction or enlargement magnification of the map is set. Furthermore, noise is displayed in a contour display; here, a selection is made as to whether the contents are displayed as absolute values optical element relative values, and a selection is also made as to whether the contents are displayed as instantaneous values or cumulative values.

4. Here, the flight of the aircraft is begun; in this example, however, an experiment was performed using a simulation rather than an actual aircraft. Accordingly, the simulator output corresponding to the operation of the aircraft is output from the simulator, and this output is taken in. The contents comprise information obtained by the flight/meteorological condition acquisition part.

5. The simulator output is read into the work area, and repeated calculations are performed; first, however, as data conversion work, the latitude and longitude of the position of the aircraft in question obtained from the GPS are converted into position information in the fixed ground coordinate system. Furthermore, the corrected air speed, equivalent air speed, true air speed and the like are determined from the indicated air speed data. Here, noise estimation calculations are performed; these calculations are successively performed for the respective observation points. The relative positions of these observation points as seen from the aircraft position are calculated, and the bearings and employment angles of the observation points as seen from the aircraft are calculated. Next, a noise table is selected from the speed information and descent angle information, and the calculation of the amount of noise attenuation that is inversely proportional to the square of the distance, the calculation of the amount of noise attenuation due to air absorption and the calculation of the amount of noise attenuation due to ground absorption are performed, so that the noise levels at these observation points are calculated. These are the instantaneous values of the noise. Furthermore, for equivalent noise, these values are added to past levels, so that cumulative values over time are determined. The above calculations are similarly performed for all of the observation points.

6. Using these calculation results, the noise levels at this point in time are drawn on the display part; furthermore, data for the next point in time is read in, and the same calculations are repeated. In this depiction of noise values, noise contours are superimposed on a base consisting of the map screen for the flight area. First, either instantaneous values or other equivalent levels are selected as the noise levels displayed in accordance with the previous operating settings. Furthermore, a display of absolute values or a display of relative values that are the differences from the threshold value is selected in accordance with the previous operating settings, and the noise levels corresponding to various colors are specified. Next, the vertex data in the square regions with the observation points as vertices is subjected to two-dimensional gradation processing, and a color display of the noise levels within the square regions is performed. The above is the basic flow of the display.

7. In cases where the noise levels at specified points are displayed as a display of numerical values, symbol marks are displayed in corresponding positions on the map. If the noise levels are equal to or less than the threshold value, these levels are displayed as numerical values using black characters; on the other hand, if these levels exceed the threshold value, the levels are displayed using red characters. This display is generally superimposed on the contour display, but may also be displayed independently.

8. In regard to the display that is performed on the display part, the display of noise levels is performed as described above with data being superimposed on the base of a map display, and has the function of drawing a symbol of one's own aircraft that indicates one's own position on the map, the function of a compass display that indicates bearings, and the function of performing a display that indicates the estimate wind direction and wind velocity. Furthermore, the display screen may be divided into sections, and instruments such as a speed indicator, altimeter, climb and descent indicator, side slip indicator and torque indicator, as well as a GPS time display, may be appropriately displayed together with the noise display image.

The present example was installed in a flight simulator, and was evaluated by a pilot. Image examples of the noise levels displayed on the display part in this case are shown in FIGS. 4 through 7. The image shown in the upper part of each figure is the actual image of the present invention in which the noise levels are displayed as color gradations on a map. However, since color displays cannot be shown in the patent drawings, map information and noise level information are mixed in these figures, and cannot be discriminated. Accordingly, noise level information alone is displayed using a brightness gradation in the lower part of each figure. FIG. 4 shows an absolute display of instantaneous noise levels. It can be read from the bottom part of the figure that the noise region is slightly offset in the direction of advance centered on the position of one's own aircraft. In actuality, these conditions can be read in the color display in the upper part of the figure superimposed on the map. In the left-side region demarcated on the screen, a speed indicator, side slip indicator, altimeter and torque indicator are displayed from the top; furthermore, an instrument display of a climb and descent indicator is set to the side of these instruments, and a GPS time display is positioned below.

FIG. 5 shows a screen that displays the difference between the instantaneous noise levels and the threshold value set on the basis of the land utilization conditions. As is seen from the GPS time display and instrument displays, the basic data is the same as that shown in FIG. 4; the difference data at this point in time is read from the lower figure displaying this alone. It is seen that since the threshold value differs according to the utilization configuration, such as facilities or the like, the utilization conditions are displayed as noise level difference information directly beneath the aircraft.

FIG. 6 shows an absolute display screen for the cumulative noise levels. This shows an addition of the instantaneous noise levels from moment to moment; accordingly, it can clearly be read from the display of the noise levels alone in the bottom part of the figure that the noise levels increase along the flight path of the aircraft. As is seen from the GPS time display and instrument displays, this is also the same as in FIGS. 4 and 5, and is a display at the same instant in time.

FIG. 7 shows a difference display screen for the cumulative noise levels. This is a display screen in which the value obtained by adding the instantaneous noise levels from moment to moment is compared with a threshold value set on the basis of the land utilization condition data, and the difference is displayed. Accordingly, it is seen that an element in which the noise levels increase along the flight path of the aircraft and a utilization condition pattern element in which the threshold value is set at a low value are superimposed in this display.

Figure 8:
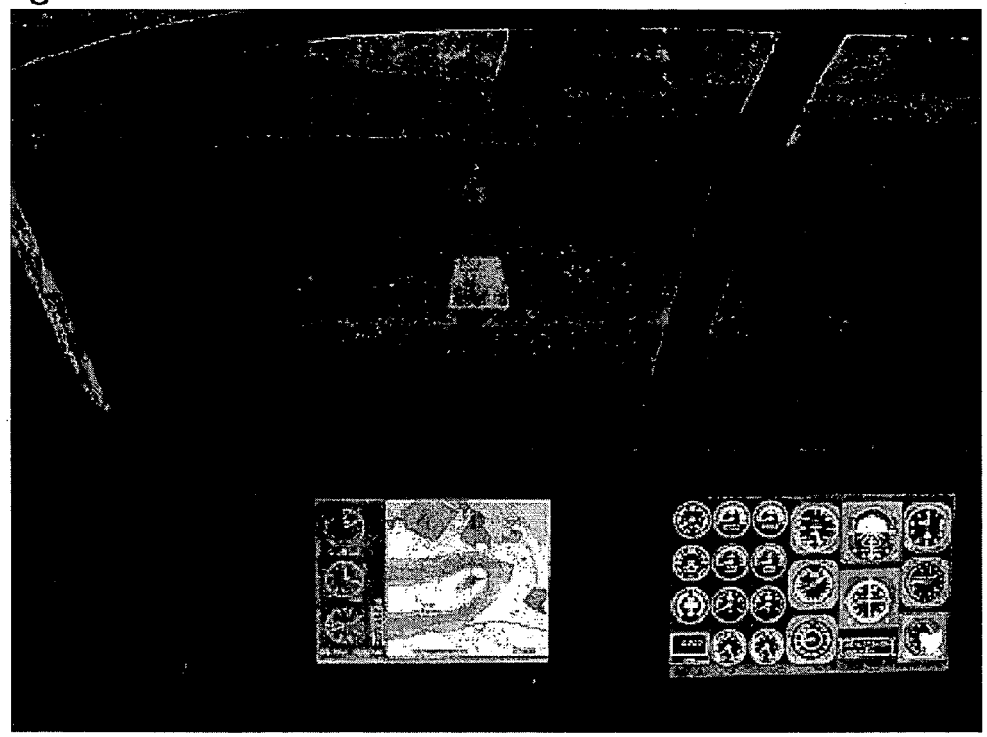
FIG. 8 is a diagram showing the conditions of noise evaluation performed by installing the system of the present embodiment in an aircraft simulator.

As is shown in FIG. 8, this display is displayed on a display part disposed alongside the instrument panel for the simulator pilot's seat. Thus, the pilot performed steering operations in the same manner as in an actual flight, and evaluated this example. On a base consisting of map information for the flight area in which facilities and the like are described, the effects of noise conditions on the flight area are calculated on the basis of environmental conditions in the flight area such as the wind direction and wind velocity, temperature and density of the atmosphere and the like, and data relating to the generation of noise by the aircraft itself, so that values that are close to reality are obtained, thus making it possible to provide these conditions to the pilot in an easily grasped display. Accordingly, it was confirmed that this system can provide support so that the pilot can perform a flight that reduces noise pollution.

Figure 9:
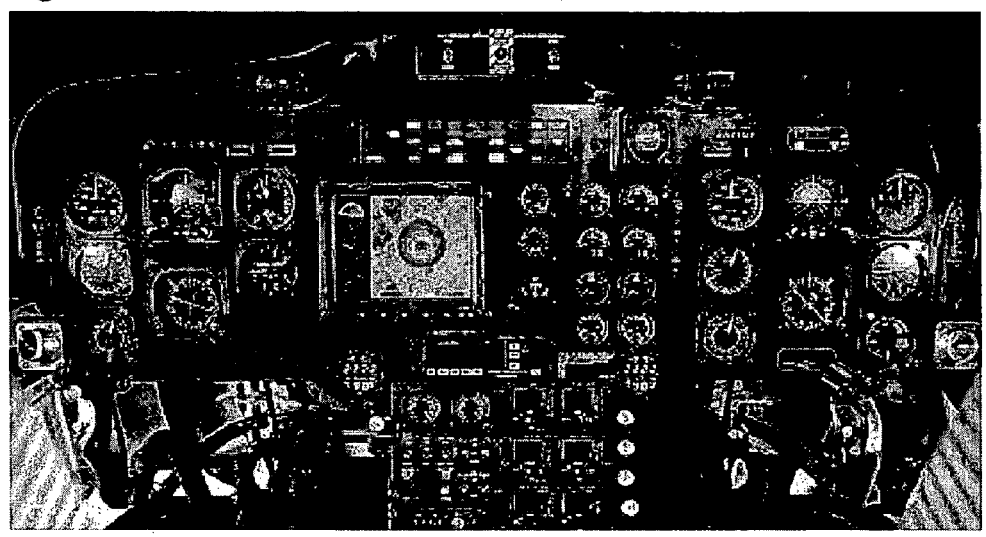
FIG. 9 is a diagram showing a configuration in which the system of the present invention is installed in an actual aircraft.

FIG. 9 shows a case in which the display part of the present invention was mounted in an actual aircraft. This was disposed as a display in substantially the central part of the instrument panel on which various instruments are disposed.

What is claimed is:

1. A low-noise flight support system comprising:
   means for estimating the noise generated by an aircraft using flight data for the aircraft,
   means for calculating a level at which the noise generated by the aircraft is propagated in various regions on the ground, and
   means for displaying the calculation results on a map, and means for obtaining meteorological information,
   wherein said meteorological information comprises at least one of air pressure, air temperature, wind direction and wind velocity, for the flight area, and
   said means for calculating the level at which the noise generated by the aircraft is propagated in various regions on the ground performs calculations with the environmental conditions being taken into account, and
   wherein the level of the noise generated by the aircraft in the respective regions on the ground is quantitatively and numerically displayed to the pilot operating the aircraft.

2. The low-noise flight support system according to claim 1, wherein the means for displaying the noise level on the ground on a map is means in which a display is installed in the instrument panel of the aircraft, and in which the noise level on the ground is displayed in real time in a contour configuration with this noise level superimposed on a map.

3. The low-noise flight support system according to claim 1, further comprising means for cumulatively calculating noise data on the ground, and comprising a function to select either instantaneous values of noise or cumulative noise data for noise to display the noise level.

4. The low-noise flight support system according to claim 2, further comprising means for cumulatively calculating noise data on the ground, and comprising a function to select either instantaneous values of noise or cumulative noise data for noise to display the noise level.

5. The low-noise flight support system according to claim 3, further comprising means for receiving cumulative noise data on the ground for other aircraft, and comprising a function to selectively display cumulative noise data on the ground with either cumulative values of noise over time generated by the aircraft or values obtained by adding together the cumulative values for the other aircraft within a specified time period.

6. The low-noise flight support system according to claim 4, further comprising means for receiving cumulative noise data on the ground for other aircraft, and comprising a function to selectively display cumulative noise data on the ground with either cumulative values of noise over time generated by the aircraft or values obtained by adding together the cumulative values for the other aircraft within a specified time period.

7. The low-noise flight support system according to claim 1, further comprising means for setting noise reference values that are applied according to the land utilization configuration on the ground and means for calculating the difference between the absolute values of noise and these reference values, and comprising a function to select the display configuration of the noise level from among the display of the absolute values of noise and display of the difference.

8. The low-noise flight support system according to claim 2, further comprising means for setting noise reference values that are applied according to the land utilization configuration on the ground and means for calculating the difference between the absolute values of noise and these reference values, and comprising a function to select the display configuration of the noise level from among the display of the absolute values of noise and display of the difference.

9. The low-noise flight support system according to claim 3, further comprising means for setting noise reference values that are applied according to the land utilization configuration on the ground and means for calculating the difference between the absolute values of noise and these reference values, and comprising a function to select the display configuration of the noise level from among the display of the absolute values of noise and display of the difference.

10. The low-noise flight support system according to claim 4, further comprising means for setting noise reference values that are applied according to the land utilization configuration on the ground and means for calculating the difference between the absolute values of noise and these reference values, and comprising a function to select the display configuration of the noise level from among the display of the absolute values of noise and display of the difference.

11. The low-noise flight support system according to claim 1, comprising a function configured to perform a numerical display on a map for specified points where it is desired to ascertain the noise conditions in quantitative terms.

12. The low-noise flight support system according to claim 11, wherein the numerical display in cases exceeding a threshold value is performed by means of an alarm display in order to evoke caution.

13. The low-noise flight support system according to claim 11, further comprising a function to superimpose the numerical display on a contour display.

14. The low-noise flight support system according to claim 12, superimposing the numerical display on a contour display.

15. The low-noise flight support system according to claim 11, further comprising noise regulation value data established for specified facility areas, wherein the means for calculating the level at which the noise generated by the aircraft is propagated in the respective regions on the ground is means which calculates the noise that is permitted for the aircraft and outputs a display of this noise.

16. The low-noise flight support system according to claim 1, comprising a function configured to perform a numerical display on a map for specified points where it is desired to ascertain the noise conditions in quantitative terms.

17. The low-noise flight support system according to claim 16, wherein the numerical display in cases exceeding a threshold value is performed by means of an alarm display in order to evoke caution.

18. The low-noise flight support system according to claim 16, superimposing the numerical display on a contour display.

19. The low-noise flight support system according to claim 17, superimposing the numerical display on a contour display.

20. The low-noise flight support system according to claim 16, further comprising noise regulation value data established for specified facility areas, wherein the means for calculating the level at which the noise generated by the aircraft is propagated in the respective regions on the ground is means which calculates the noise that is permitted for the aircraft and outputs a display of this noise.

* * * * *